United States Patent
Joo et al.

(10) Patent No.: US 8,625,289 B2
(45) Date of Patent: Jan. 7, 2014

(54) ELECTRONIC CARD MODULE INCLUDING FUNCTION OF STORING INFORMATION REGARDING FABRICATION/MAINTENANCE/DRIVING OF A PRODUCT

(75) Inventors: Seong Chul Joo, Yongin-si (KR); Young Min Kweon, Seoul (KR)

(73) Assignee: Xeonet Co., Ltd., Seongnam-Si, Gyeonggi-Do (KR)

( * ) Notice: Subject to any disclaimer, the term of this patent is extended or adjusted under 35 U.S.C. 154(b) by 86 days.

(21) Appl. No.: 13/519,214

(22) PCT Filed: Jun. 23, 2011

(86) PCT No.: PCT/KR2011/004579
§ 371 (c)(1),
(2), (4) Date: Jun. 26, 2012

(87) PCT Pub. No.: WO2012/030059
PCT Pub. Date: Mar. 8, 2012

(65) Prior Publication Data
US 2012/0293970 A1    Nov. 22, 2012

(30) Foreign Application Priority Data
Sep. 2, 2010 (KR) .................. 10-2010-0086010

(51) Int. Cl.
*H05K 1/14* (2006.01)
(52) U.S. Cl.
USPC ............................ 361/736; 361/720; 324/574

(58) Field of Classification Search
USPC .................. 361/720, 760, 736, 748; 324/574
See application file for complete search history.

(56) References Cited

U.S. PATENT DOCUMENTS

| | | | |
|---|---|---|---|
| 4,538,675 A * | 9/1985 | Welsh ........................ 165/80.4 |
| 4,809,185 A * | 2/1989 | Talmadge ................... 705/403 |
| 4,970,726 A | 11/1990 | Carn et al. |
| 5,420,912 A * | 5/1995 | Kopp et al. ................. 455/563 |
| 6,385,739 B1 | 5/2002 | Barton et al. |
| 2002/0124114 A1 | 9/2002 | Bottom et al. |
| 2003/0069953 A1 | 4/2003 | Bottom et al. |
| 2007/0027981 A1 | 2/2007 | Coglitore et al. |

FOREIGN PATENT DOCUMENTS

| | | |
|---|---|---|
| JP | 2006086281 A | 3/2006 |
| KR | 10-2005-0032265 A | 4/2005 |
| KR | 10-2008-0022168 A | 3/2008 |

* cited by examiner

Primary Examiner — Hung S Bui
(74) Attorney, Agent, or Firm — Sherr & Jiang, PLLC

(57) ABSTRACT

An electronic card module which includes the function of storing information regarding the fabrication/maintenance/driving of a product. The electronic card module has a main function circuit unit configured by mounting various electronic components on a PCB substrate. The electronic card module is formed with the PCB module in one piece and includes an information provision unit which stores information including product fabrication information, maintenance information, and driving information, and which provides the information when a request is made from an external device.

6 Claims, 4 Drawing Sheets

PCB Front panel
PCB

ELECTRONIC CARD MODULE INCLUDING FUNCTION OF STORING INFORMATION REGARDING FABRICATION/MAINTENANCE/DRIVING OF A PRODUCT

CROSS-REFERENCES TO RELATED APPLICATIONS

The present application claims priority to International Application PCT/KR2011/004579, with an International Filing Date of Jun. 23, 2011, which claims the benefit of Korean Patent Application No. 10-2010-0086010 filed in the Korean Intellectual Property Office on Sep. 2, 2010, the entire contents of which are incorporated herein by reference.

BACKGROUND OF THE INVENTION

1. Field of the Invention

The present invention relates to an electronic card module equipped with a function of storing information about the fabrication/maintenance/operation of a product and, more particularly, to an electronic card module (an electronic module, an electronic board, a digital board, etc.) for storing information about its own fabrication, maintenance, and operation in various industrial electronic card modules and for monitoring and managing the electronic card module based on the stored information.

2. Background of the Related Art

An electronic card module (an electronic module or an electronic board) used in various industries and homes is configured to have various electronic parts, such as semiconductor chips (ICs), condensers, resistors, transistors, and slots, mounted on a PCB according to system implementation and to have a main function circuit unit formed therein. The electronic card module is being used according to various industry systems, such as a computer, a telephone exchange, an industry plant, an Internet system, a network system, a power source controller, and a specific driving device.

FIG. 1 is a schematic plan view of a conventional exemplary electronic card module. As shown, the electronic card module 1 includes a fixing member fixed to one side of a PCB panel in order to fix the module to a rack 100 and a main function circuit unit 10 including various electronic parts configured to perform the functions of the module and mounted on the PCB.

Each of the electronic card modules plays an important role in implementing the entire system. When one module fails, the entire system is stopped or an error is generated in the entire system. It is thus very important to individually manage the electronic card modules. Furthermore, a system including a number of the electronic card modules must be thoroughly managed because it is very sensitive to a change of an environment, such as temperature or humidity.

Accordingly, there is a need to manage the entire history from a process of fabricating a product to a process of using the product, such as pieces of information about the fabrication, maintenance, and operation of the electronic card module product.

However, a conventional electronic card module is problematic in that an administrator must write by hand and maintain information about fabrication, maintenance, and operation during a system operation because the electronic card module does not include a circuit capable of storing the information. Furthermore, a history of the electronic card module is not properly managed because there is a strong possibility that the information may be lost owing to careless management after a lapse of long time. Accordingly, in case of operating time, there is a problem in that an accurate time to replace parts is not properly managed because the time actually used is different from the time used on record.

Furthermore, an expensive electronic card module is replaced according to an equipment use period after use of some time on the basis of fabrication year/month/day, irrespective of whether the electronic card module is normally operated. This electronic card module is problematic in that management is inconvenient because an administrator must record operation information by hand on the basis of fabrication year/month/day and an actual operating time count is difficult because there is time when the electronic card module is not driven. Accordingly, the electronic card module is replaced after a lapse of an equipment use period even though the electronic card module has a lot of the remaining use period. Consequently, the utilization efficiency of an expensive electronic card module is low, and the operation of the electronic card module is not reliable.

Furthermore, the electronic card module that cannot count the time used actually may cause a failure owing to low reliability, and a failure of one or two sheets of electronic card modules may stop the entire control system. Accordingly, there is a problem in that an enormous loss may be generated in a large-sized system (a generation plant, a production plant, etc.).

SUMMARY OF THE INVENTION

The present invention has been made in view of the above problems occurring in the prior art, and it is an object of the present invention to achieve the systematic management of an electronic card module by configuring the electronic card module so that information about the electronic card module, including fabrication information, maintenance information, and operation information, is detected through an independently configured information provision unit, the detected information is stored, and the stored information is conveniently searched for if necessary.

Furthermore, an object of the present invention is to provide an electronic card module capable of monitoring its own information, stored in information storage memory, through the communication port of the information provision unit on-line or capable of directly exchanging data with an external device through an additional port.

Furthermore, an object of the present invention is to achieve more systematic management by taking an environmental influence or a system influence on the electronic card module into consideration through a temperature sensor and a humidity sensor.

Accordingly, an object of the present invention is to provide a storage function capable of effectively managing repair matters, matters that require attention, and a replacement time by taking all pieces of information about an electronic card module, such as the fabrication characteristics, fabrication year, fabrication date, maintenance history, and operating time of the electronic card module, into consideration based on information about the fabrication, maintenance, and operation of the electronic card module.

To achieve the above objects, the present invention provides an electronic card module (an electronic module or an electronic board) equipped with a function of storing fabrication information, maintenance information, and operation information about a product and configured to have various electronic parts mounted on a PCB and to have a main function circuit unit configured therein, thus implementing a specific system, the electronic card module, including an information provision unit integrally formed with the PCB forming the electronic card module and configured to store the fabrication information, maintenance information, and operation information of the electronic card module and to provide the pieces of information when there is a request from an external device.

Furthermore, the information provision unit includes a communication port for communicating with the external device in accordance with a serial communication multi-drop method, information storage memory for storing the fabrication information, maintenance information, and operation information of the electronic card module, an operating time detection circuit for detecting information about an operation of the main function circuit unit, and a control unit for performing control so that temperature, humidity, and voltage are detected and an operating time is detected and performing control so that the pieces of information about the electronic card module is stored in the information storage memory based on the pieces of detected information.

Furthermore, the information provision unit includes a voltage detection unit configured to detect actual voltage supplied from the main function circuit unit to the electronic card module, a temperature/humidity sensor configured to detect temperature and humidity external to the electronic card module, and an A/D conversion circuit connected to have one side connected to the temperature/humidity sensor and the other side connected to the control unit and configured to A/D convert an analog temperature/humidity signal for determining whether the electronic card module is stably operated into digital temperature/humidity data, wherein information about used temperature and humidity is obtained for each hour and stored in the information storage memory.

Furthermore, the operation information is detected by detecting operating voltage supplied to the main function circuit unit.

Furthermore, the fabrication information includes pieces of information about a module name, a model number, a serial number, a certification of technology, a manufacturer, a sales company, a company address/telephone number/department in charge, a fabrication date, module standards, functions, a circuit drawing, a part deployment drawing, and a list of parts (standards and manufacturers).

Furthermore, the maintenance information includes pieces of information, such as a test method, test equipment, test results, a maintenance date, the contents of maintenance, maintenance results, and a part replacement statement.

Furthermore, the operation information includes operation data regarding an accumulated operating time for operating temperature exceeding a reference value, an accumulated operating time for operating humidity exceeding a reference value, and an accumulated operating time for operating voltage exceeding a reference value based on read temperature, humidity, and voltage data and information about an accumulated operating time.

Furthermore, the information provision unit further comprises a USB port for inputting/outputting the pieces of information about the fabrication, maintenance, and operation of the electronic card module, stored in the information storage memory, to/from the external device.

DESCRIPTION OF REFERENCE NUMERALS OF PRINCIPAL ELEMENTS IN THE DRAWINGS

Figure 1:
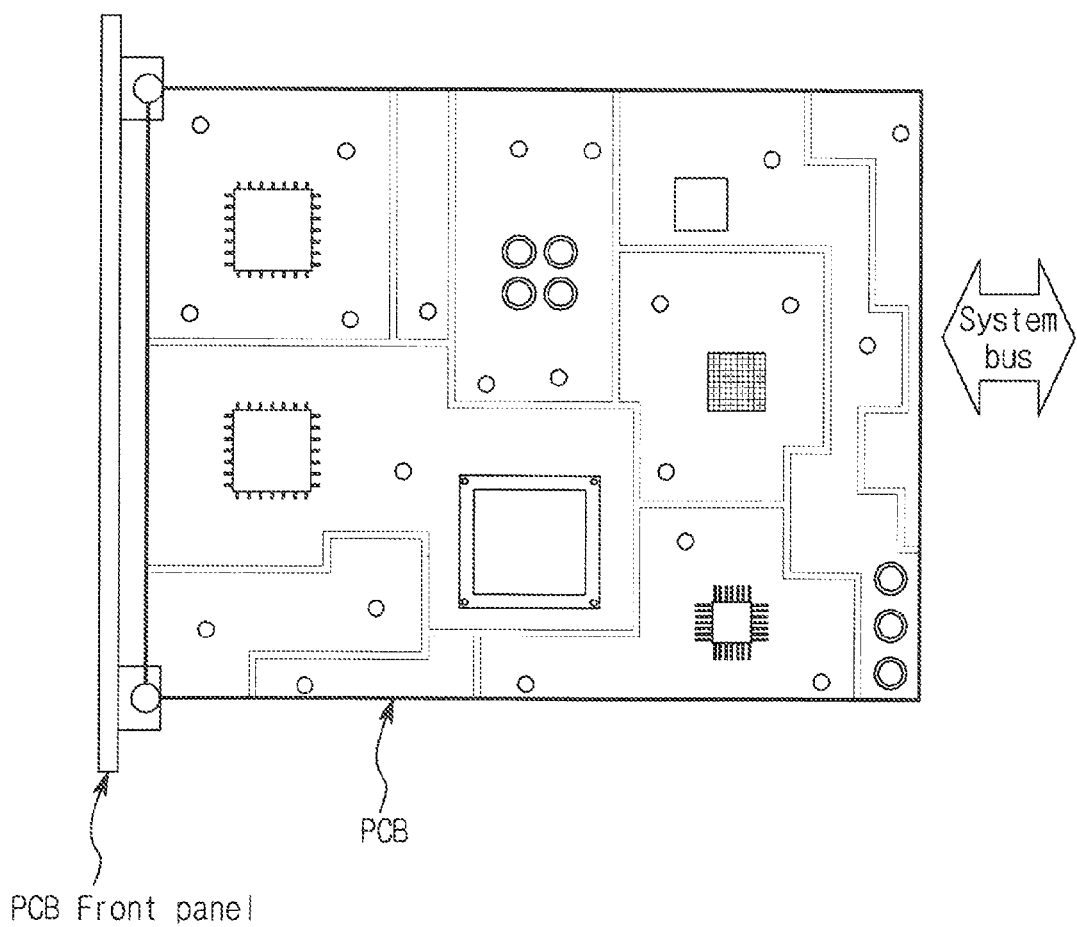
FIG. 1 is a schematic plan view of a conventional exemplary electronic card module.

1: electronic card module
10: main function circuit unit
11: communication port
12: control unit
13: A/D conversion circuit
14: temperature/humidity sensor
15: operating time detection circuit
16: voltage detection unit
17: information storage memory
18: USB port
20: information provision unit
100: rack
110: external device

DETAILED DESCRIPTION OF EMBODIMENTS

Hereinafter, a preferred embodiment of an electronic card module equipped with a function of storing information about the fabrication, maintenance, and operation of a product according to the present invention is described in detail with reference to the accompanying drawings. It is to be noted that in assigning reference numerals to respective constituent elements in the drawings, the same reference numerals designate the same constituent elements throughout the drawings although the constituent elements are shown in different drawings. Furthermore, in describing the present invention, a detailed description of the known functions and constructions will be omitted if it is deemed to make the gist of the present invention unnecessarily vague.

In an electronic card module (an electronic module or an electronic board) configured to have various electronic parts mounted on a PCB and to have a main function circuit unit 10 configured therein, thus implementing a specific system, according to the present invention, the electronic card module includes an information provision unit 20 integrally formed with the PCB and configured to store information about the fabrication, maintenance, and operation of the electronic card module and to provide the pieces of information when there is a request from an external device.

Figure 2:
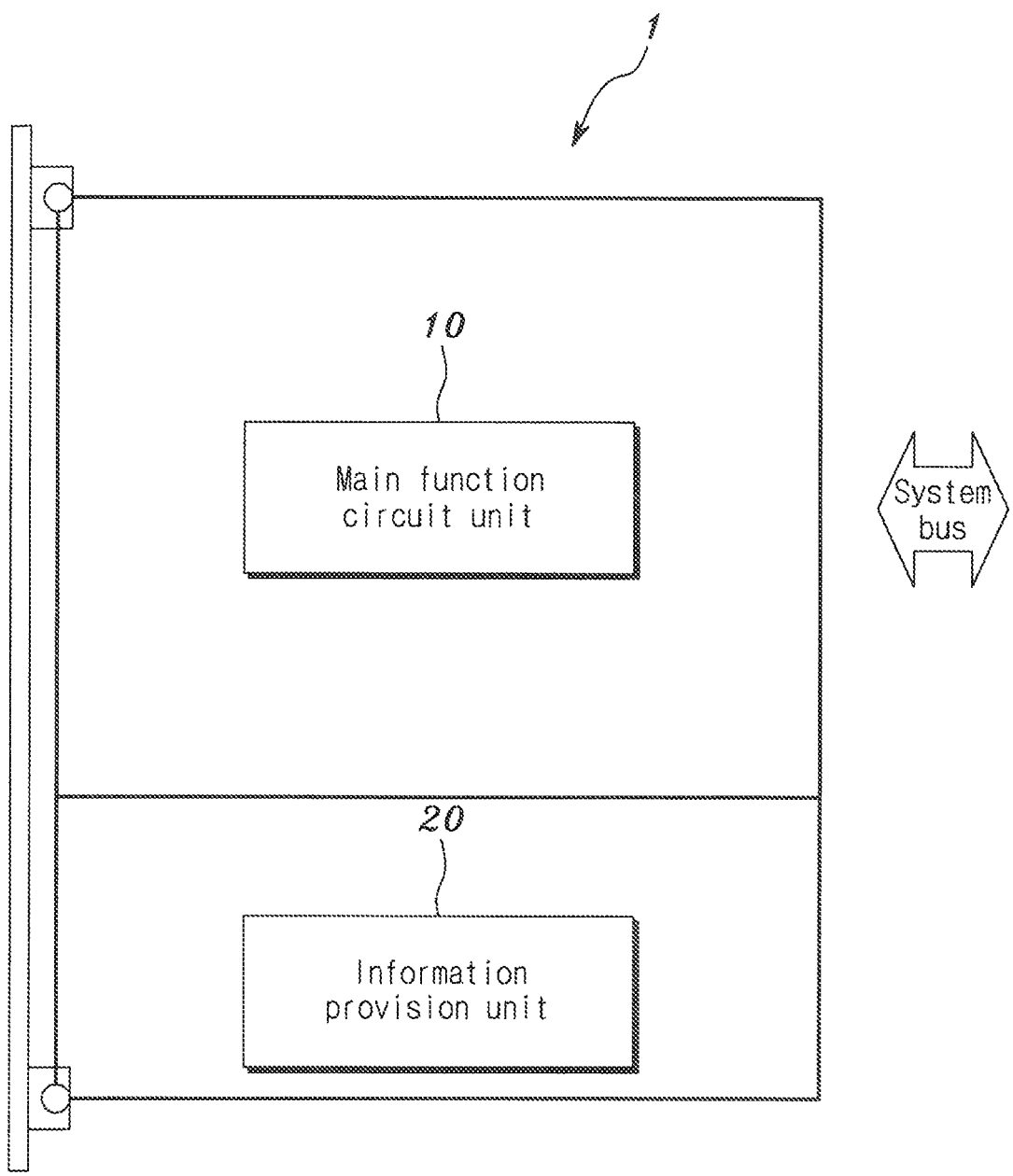
FIG. 2 shows a schematic construction of an electronic card module equipped with a function of storing fabrication information, maintenance information, and operation information according to the present invention.

FIG. 2 shows a schematic construction of an electronic card module equipped with a function of storing fabrication information, maintenance information, and operation information according to the present invention. The electronic card module according to the present invention has a major technical gist in which the information provision unit 20 capable of storing and/or detecting pieces of information about the electronic card module, such as pieces of information about the fabrication, maintenance, and operation of the product, is configured in one substrate along with the main function circuit unit 10 and is configured to output the pieces of information to an external device.

Here, the fabrication information includes information about a module name, a model number, a serial number, a certification of technology, a manufacturer, a sales company, a company address/telephone number/department in charge, a fabrication date, module standards, functions, a circuit drawing, a part deployment drawing, and a list of parts (standards and a manufacturer).

The maintenance information includes information about a test method, test equipment, test results, a maintenance date, the contents of maintenance, maintenance results, a part replacement statement, and software update.

The operation information includes information includes operation data regarding an accumulated operating time for operating temperature exceeding a reference value, an accumulated operating time for operating humidity exceeding a reference value, and an accumulated operating time for operating voltage exceeding a reference value based on read temperature, humidity, and voltage data and information about an accumulated operating time.

The information provision unit 20 detects a period of time during which the electronic card module integrally mounted on the substrate of the electronic card module is used and information about the electronic card module and stores the detected period of time and the detected information about the electronic card module. The information provision unit 20 includes a communication port connectable to an external device or a communication network and sends the detected period of time and the detected information externally.

Meanwhile, the main function circuit unit 10 of the electronic card module shown in FIG. 2 is designed to implement the functions of the electronic card module and may be configured to have numerous types of circuit units mounted thereon in order to perform functions according to various industry fields. For example, various interfaces or communication ports, a control unit, and memory may be configured in the main function circuit unit 10, and they are configured depending on various industrial electronic card modules, but not limited thereto.

Figure 3:
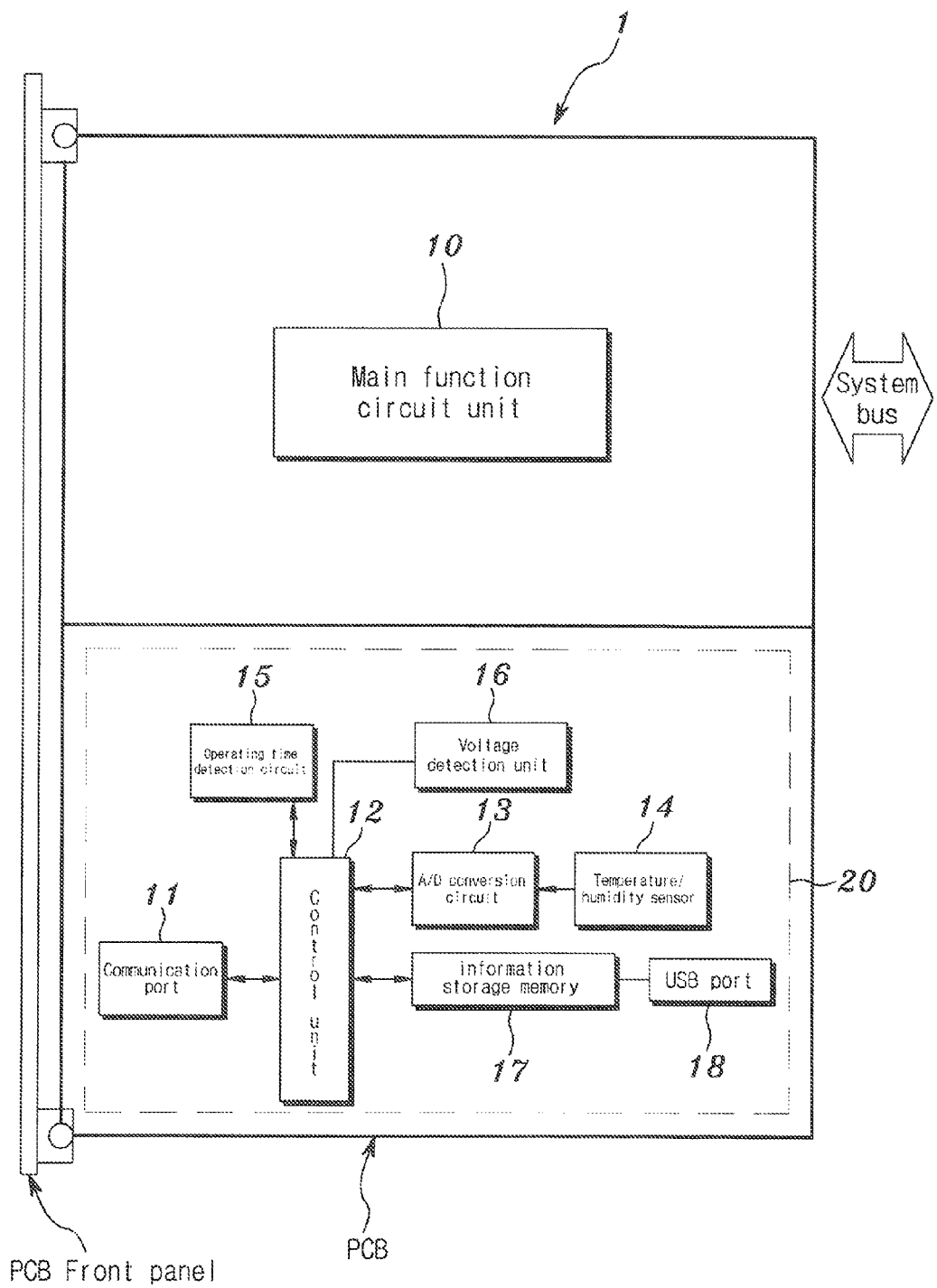
FIG. 3 shows a detailed construction of the electronic card module equipped with the function of storing fabrication information, maintenance information, and operation information according to an embodiment of the present invention.

FIG. 3 shows a detailed construction of the electronic card module equipped with the function of storing fabrication information, maintenance information, and operation information according to an embodiment of the present invention.

As an example according to the present invention, the electronic card module for storing fabrication information, maintenance information, and operation information includes the information provision unit 20 for detecting and storing the fabrication information, such as a fabrication date, a fabrication part, a circuit design drawing, and a product lifespan when the product is fabricated, the maintenance information, such as a maintenance statement according to a failure or the occurrence of an error while the electronic card module is used, and the operation information, such as the operating time, operation state, environmental element temperature, humidity, and the supply of overvoltage of the electronic card module. Here, an additional detection function is not performed on the fabrication information, for example, because the fabrication information is inputted when the electronic card module is fabricated and then and stored in memory included in the information provision unit. In contrast, the maintenance information and the operation information are stored in the memory through a detection step in order to store the maintenance information and the operation information.

Meanwhile, in case of the maintenance information, an administrator may store a performed repair statement in the memory without performing a detection function or may store the repair statement in the memory by performing the detection function. In case of the maintenance information, a repairman has to directly input hardware information, such as the replacement of parts, but detects and stores input/output data signals in case of software maintenance, such as the firmware or drive update of the electronic card module.

The input of the fabrication information and the detection and input of the maintenance information and the operation information are illustrative, and the input/output of reliable data may be changed by a manufacturer, a repairman, and a user in terms of industrial use. For example, although fabrication information is initially inputted and stored in the memory, if the fabrication information is subsequently changed, pieces of information, such as a company name and a contact point, may be properly changed. Operation information that is detected and stored may also be arbitrarily changed by taking the stability of the electronic card module into consideration.

An example of the detailed construction of the information provision unit for performing the functions as described above is described.

The information provision unit includes a control unit 12 configured to perform control so that temperature/humidity/voltage and an operating time are detected, a communication port 11 connected to the control unit 12 and configured to perform communication with an external device according to a serial communication RS485 multi-drop method, information storage memory 17 connected to the control unit 12 and configured to store various pieces of information, such as fabrication information, maintenance information, and operation information, a temperature/humidity sensor 14 configured to detect temperature and humidity of the electronic card module, an A/D conversion circuit 13 configured to have one side connected to the temperature/humidity sensor 14 and the other side connected to the control unit 12 and configured to A/D convert an analog temperature/humidity signal for determining whether the electronic card module is stably operated or not into digital temperature/humidity data and to provide the digital temperature/humidity data, a voltage detection unit 16 configured to detect operation information by detecting actual voltage (e.g., 5 V, 12 V, or 24 V) supplied from a power source unit to an electronic card and to determine whether the supplied voltage corresponds to overvoltage, an operating time detection circuit 15 connected to the control unit 12 and configured to detect the operating time (work time) of the electronic card module, and a USB port 18 configured to input data to the information storage memory through the port of the USB standards and to receive stored data.

The communication port 11 may connect a number of the electronic card modules according to the present invention, and it may be configured so that information about the electronic card modules can be supplied on-line. In general, a number of card modules are consecutively mounted on the rack of the electronic card module. In this case, the modules may be connected through the communication port 11, and fabrication information, maintenance information, and operation information stored in the information storage memory may be supplied.

The temperature/humidity sensor 14 detects environmental elements within a space where the electronic card module is operated, detects temperature or humidity of a relevant space, and stores operation information according to the temperature and humidity. The electronic card module includes a variety of parts sensitive to external environments. If the electronic card module is operated out of a proper operating temperature or humidity environment, an error may occur in the electronic card module or the electronic card module may be damaged. Accordingly, the electronic card module can be effectively managed by detecting information about temperature and humidity and storing operation information by incorporating the detected temperature and humidity into the operation.

The operating time detection circuit 15 detects information about the operation of the electronic card module, that is, an operating time. For example, the operating time detection circuit 15 detects voltage supplied to the electronic card module while operating in conjunction with the voltage detection unit and detects an operating time. The voltage detection unit is supplied with a main power source supplied to the electronic card module and is configured to check whether the electronic card module is operated or not. The operating time detection circuit counts the time through supplied voltage and stores operation information. Furthermore, the voltage detection unit detects whether overvoltage is supplied to the electronic card module or not. If overvoltage exceeding rated voltage is supplied to the electronic card module, the voltage detection unit detects and supplies voltage so that an overvoltage capacity and an overvoltage supply time can be detected. If a power, source supplied to an electronic card is stopped and then supplied thereto again, the voltage detection unit checks information about a period of time during which the electronic card has been used, accumulated right before the power source is stopped, in the information storage memory, continues to accumulate a period of time during which the electronic card is being used after the information about the period of time (i.e., a period of time during which the electronic card is being used after the power source is supplied), counts the accumulated time, and stores the counted time in the information storage memory.

When the electronic card module is separated from a rack, the USB port 18 directly receives data stored in the memory using an additional terminal or directly inputs data to the memory using an additional terminal. Fabrication information, maintenance information, and operation information may be inputted and outputted through the USB port 18.

The construction of the information provision unit illustrates an example of a construction of an information provision unit for detecting pieces of information, including fabrication information, maintenance information, and operation information, but not limited thereto. A person having ordinary skill in the art may readily change a construction for detecting and storing various pieces of information corresponding to the electronic card module.

Figure 4:
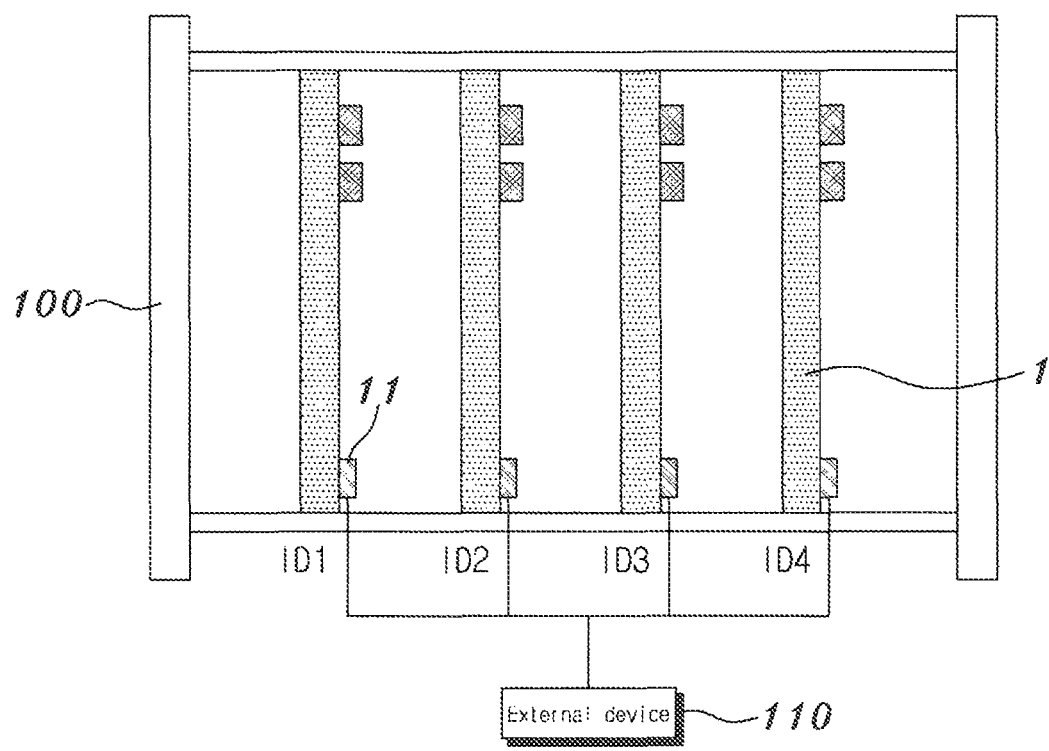
FIG. 4 is a diagram showing the state in which the electronic card module mounted on a rack is connected to an external device according to an embodiment of the present invention.

FIG. 4 is a diagram showing the state in which the electronic card module mounted on a rack is connected to an external device according to an embodiment of the present invention.

A rack 100 on which the electronic card modules are mounted in order to construct various control systems is connected to an external device through pieces of information about the electronic card modules according to the present invention through the communication ports 11 of the information provision units and configured to detect the pieces of information. Information about a specific module stored in the information storage memory can be searched for because a unique ID is allocated to and stored in the electronic card module.

An example in which the electronic card module including the function of storing information about the fabrication, maintenance, and operation of a product according to the present invention and an operating principle of the electronic card module are described in detail below.

First, when information about the fabrication of the electronic card module integrated with the information provision unit and fabricated in a PCB panel is received from an external device 110 through the communication port 11 in accordance with a serial communication method, the fabrication information is transmitted to the control unit 12 of the electronic card module. The control unit stores the information, received from the external device 110, in the information storage memory 17. As described above, the fabrication information corresponds to information, such as a model name, a manufacturer, and fabrication year/month/day. When the electronic card module is initially fabricated, the fabrication information is received through the external device and then stored in the information provision unit.

The electronic card module in which the fabrication information of the product is stored is installed in a rack or a panel for implementing a system, such as a large-sized slot, in order to implement the system. From a point of time at which the electronic card module is actually used, the maintenance information and operation information are detected, inputted, and stored in the information storage memory 17.

First, the operation information is described. The voltage detection unit of the information provision unit detects voltage supplied to the main function circuit unit, recognizes that the electronic card module is in an operating state ON from the detected time, and checks an operating time. The voltage detection unit checks a period of time during which the electronic card module is used while operating in conjunction with the operating time detection circuit 15. If a power source supplied to the main function circuit unit is blocked, the voltage detection unit recognizes that the electronic card module is not operated and thus does not accumulate the operating time. Furthermore, the voltage detection unit detects overvoltage supplied to the main function circuit unit, detects an overvoltage capacity or a period for which the overvoltage is supplied, and stores information about the operation of the electronic card module in detail. For example, if rated voltage (V) is 5 V, but voltage of 6 V is supplied for 10 seconds, the voltage detection unit stores information about voltage of 6 V supplied for 10 seconds. The same principle may apply to a current value A.

Accordingly, the voltage detection unit and the operating time detection circuit recognize whether the electronic card module is operated or not and store operation information, such as information about a period of time during which the electronic card module is used, in the information storage memory.

The temperature/humidity sensor 14 detects ambient humidity and temperature of the electronic card module and detects operation information depending on relevant temperature and humidity. The temperature/humidity sensor 14 detects information about the detailed operation of the electronic card module and more precisely checks and stores the operating state of the electronic card module which is sensitive to an environmental influence.

The maintenance information about a maintenance statement may be directly inputted through the communication port 11 or the USB port 18. Pieces of information, such as a part replacement statement, a maintenance date, the contents of maintenance, and maintenance results, may be inputted in a text form.

In accordance with the present invention constructed as described above, pieces of information about the fabrication, maintenance, and operation of an electronic card module can be systematically managed, and the replacement of a module, a maintenance statement, and relevant information can be searched for in detail. Accordingly, there is an advantage in that effective maintenance and repair can be achieved.

As described above, an electronic card module can be systematically managed because the information provision unit included in the electronic card module according to the present invention stores, detects, and stores pieces of use information, including information about the fabrication, maintenance, and operation of the electronic card module and an administrator searches for the stored information if necessary. Accordingly, there are advantages in that an actual period of time during which the electronic card module has been used can be managed, a maintenance history can be managed, the electronic card module whose replacement time has been accurately determined based on the actual period of time during which the electronic card module has been used can be maintained and repaired, and whether the electronic card module is stably operated or not can be determined based on operation information.

Furthermore, since an operating time is recorded through the operating time detection circuit, the time when a part will be replaced can be precisely determined on the basis of fabrication year/month/day and an industrial electronic card module having a possibility of a failure can be replaced. Accordingly, there is an advantage in that a failure of an electronic card module during a system operation can be prevented.

Furthermore, since the time when various electronic card modules will be replaced is determined with reference to fabrication information, maintenance information, and operation information, there are advantages in that the electronic card modules can be stably operated and the stability of the entire system including the modules can be improved.

As described above, the preferred embodiments of the present invention have been described, but the present invention is not limited to the embodiments. It is evident to those skilled in the art that the present invention may be modified and applied in various ways within the technical spirit of the present invention. Accordingly, the true scope of the present invention, should be interpreted by the following claims, and the entire technical spirit falling within an equivalent range should be interpreted as being included in the scope of the present invention.

What is claimed is:

1. An electronic card module (an electronic module or an electronic board) equipped with a function of storing fabrication information, maintenance information, and operation information about a product and configured to have various electronic parts mounted on a PCB and to have a main function circuit unit configured therein, thus implementing a specific system, the electronic card module, comprising:

an information provision unit integrally formed with the PCB forming the electronic card module and configured to store the fabrication information, maintenance information, and operation information of the electronic card module and to provide the pieces of information when there is a request from an external device, the information provision unit comprising:

a communication port for communicating with the external device in accordance with a serial communication multi-drop method;

an information storage memory for storing the fabrication information, maintenance information, and operation information of the electronic card module;

an operating time detection circuit for detecting information about an operation of the main function circuit unit;

a control unit for performing control so that temperature, humidity, and voltage are detected and an operating time is detected and performing control so that the pieces of information about the electronic card module is stored in the information storage memory based on the pieces of detected information;

a voltage detection unit configured to detect actual voltage supplied from the main function circuit unit to the electronic card module;

a temperature/humidity sensor configured to detect temperature and humidity external to the electronic card module; and an A/D conversion circuit connected to have one side connected to the temperature/humidity sensor and the other side connected to the control unit and configured to ND convert an analog temperature/humidity signal for determining whether the electronic card module is stably operated into digital temperature/humidity data, wherein information about used temperature and humidity is obtained for each hour and stored in the information storage memory.

2. The electronic card module as claimed in claim 1, wherein the operation information is detected by detecting operating voltage supplied to the main function circuit unit.

3. The electronic card module as claimed in claim 1, wherein the fabrication information includes one or more pieces of information about a module name, a model number, a serial number, a certification of technology, a manufacturer, a sales company, a company address, telephone number and department in charge of the sales company, a fabrication date, module standards, functions, a circuit drawing, a part deployment drawing, and a list of parts (standards and manufacturers).

4. The electronic card module as claimed in claim 1, wherein the maintenance information includes one or more pieces of information about a test method, test equipment, test results, a maintenance date, the contents of maintenance, maintenance results, and a part replacement statement.

5. The electronic card module as claimed in claim 1, wherein the operation information includes operation data regarding an accumulated operating time for operating temperature exceeding a reference value, an accumulated operating time for operating humidity exceeding a reference value, and an accumulated operating time for operating voltage exceeding a reference value based on read temperature, humidity, and voltage data and information about an accumulated operating time.

6. The electronic card module as claimed in claim 1, wherein the information provision unit further comprises a USB port for inputting/outputting the pieces of information about the fabrication, maintenance, and operation of the electronic card module, stored in the information storage memory, to/from the external device.

* * * * *